Dec. 24, 1968    A. E. VASSILIADES    3,418,250
MICROCAPSULES, PROCESS FOR THEIR FORMATION AND TRANSFER
SHEET RECORD MATERIAL COATED THEREWITH
Filed Oct. 23, 1965    2 Sheets-Sheet 1

——————— PRINCIPAL STEPS
— — — — ALTERNATIVE STEPS

INVENTOR.
ANTHONY E. VASSILIADES
BY Beale and Jones
ATTORNEYS

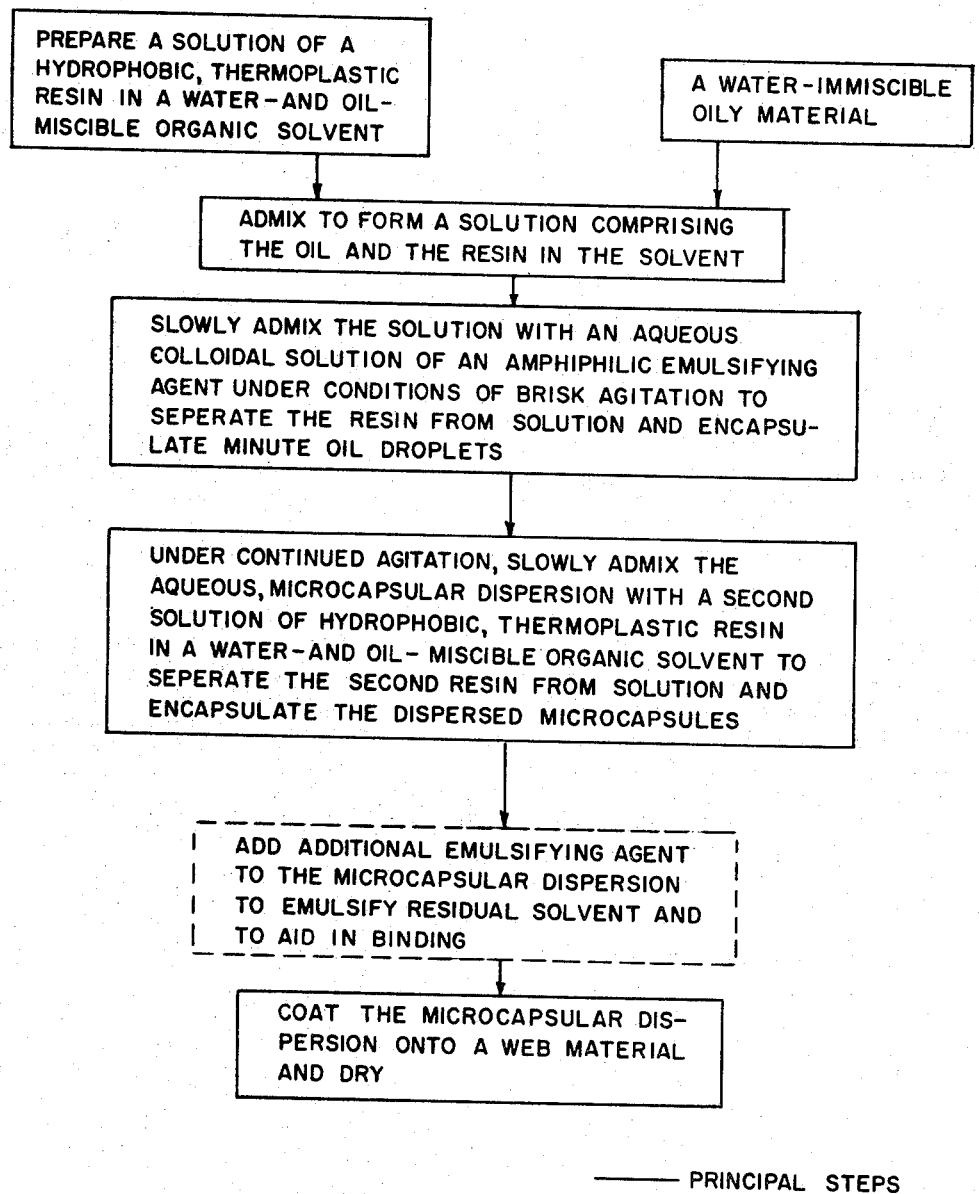

United States Patent Office

3,418,250
Patented Dec. 24, 1968

3,418,250
MICROCAPSULES, PROCESS FOR THEIR FORMATION AND TRANSFER SHEET RECORD MATERIAL COATED THEREWITH
Anthony E. Vassiliades, Staten Island, N.Y., assignor to U.S. Plywood-Champion Papers, Inc., a corporation of New York
Filed Oct. 23, 1965, Ser. No. 503,966
14 Claims. (Cl. 252—316)

ABSTRACT OF THE DISCLOSURE

Microcapsules containing droplets of a water-immiscible oily material are produced in the absence of coacervation by admixing a water-immiscible oily material, at least one thermoplastic resin solution and water, with the water effecting the separation of the resin from solution in solid particle form about a nucleus of said oily material upon dilution therewith as the final operation of the process.

---

This invention relates to the novel microencapsulation of oils. More specifically, this invention pertains to the processes for encapsulating minute oil droplets, the products produced thereby, and the utility thereof in pressure-responsive, transfer-copy systems.

For about the last ten years, microcapsules containing both liquid and solid nucleus materials have found widespread acceptance in a variety of commercial applications. For example, one of the most widespread utilities has been in the art of transfer-copy systems wherein minute droplets of a colorless dye intermediate dispersed or dissolved in an oil are encapsulated and coated onto a transfer sheet. The dye intermediate is thereafter transferred to a copy sheet by rupturing said capsules. The underlying copy sheet has an adsorbent coating thereon containing a material which will react with the dye intermediate causing a visible colored mark at points where the microcapsules have been ruptured and the dye transferred. Other recent applications in which microcapsules have been used extensively are in adhesives and adhesive tapes, fertilizers, pharmaceuticals, foods and cosmetics. In the majority of these applications, microencapsulation involves the "coacervation" phenomenon.

Coacervation is the term applied to the ability of a number of aqueous solutions of colloids, to separate into two liquid layers, one rich in colloid solute and the other poor in colloid solute. Factors which influence this liquid-liquid phase separation are: (a) the colloid concentration, (b) the solvent of the system, (c) the temperature, (d) the addition of another polyelectrolyte, and (e) the addition of a simple electrolyte to the solution.

A unique property of coacervation systems is the fact that the solvent components of the two phases are the same chemical species. This is a major distinguishing characteristic of coacervates as compared to two phase systems involving two immiscible liquids. Thus, a colloidal solute particle migrating across the interface of a two-phase coacervate system finds itself in essentially the same environment on either side of the interface. From the viewpoint of composition, the difference between the two phases is a difference in concentration of solute species. Structurally, the two phases differ in that the colloidal solute of the colloid-poor phase is randomly oriented and the colloidal solute of the coacervate or colloid-rich phase shows a great deal of order. In all cases where coacervation has been observed, the solute species are geometrically anisotropic particles.

Coacervation can be of two general types. The first is called "simple" or "salt" coacervation where liquid phase separation occurs by the addition of a simple electrolyte to a colloidal solution. The second is termed "complex" coacervation where phase separation occurs by the addition of a second colloidal species to a first colloidal solution, the particles of the two dispersed colloids being oppositely charged. Generally, materials capable of exhibiting an electric charge in solution (i.e., materials which possess an ionizable group) are coacervatable. Such materials include natural and synthetic macromolecular species such as gelatin, acacia, tragacanth, styrene-maleic anhydride copolymers, methyl vinyl ether-maleic anhydride copolymers, polymethacrylic acid, and the like.

With both simple and complex coacervate systems, a necessary precondition for coacervation is the reduction of the charge density of the colloidal species. In the case of simple coacervation, this reduction of the charge density along with partial desolvation of the colloidal species is similar to that preceding the flocculation or precipitation of a colloid with the addition of a simple electrolyte since it is known that the addition of more electrolyte to a simple coacervate leads to a shrinking of the colloid-rich layer and the subsequent precipitation of the colloidal species. This same reduction of charge density along with partial desolvation of the colloidal species which precedes the precipitation of two oppositely charged colloids from solution may also be regarded to be the cause for the phase separation in a complex coacervate system. However, while the reduction of the charge density is a necessary precondition for coacervation, it is oftentimes not sufficient for coacervation. In other words, the reduction of the charge density on the colloidal particles must alter or modify the solute-solute interactions to such an extent that the colloidal particles will tend to aggregate and form a distinct, continuous liquid phase rather than a flocculant or a solid phase. This tendency is attributable to both coulombic and long-range Van der Waal's interactions of large aggregates in solution. Thus, in both "simple" and "complex" coacervation, two-solution phase formation begins with the colloidal species aggregating to form submicroscopic clusters; these clusters coalesce to form microscopic droplets. Further coalescense produces macroscopic droplets which tend to separate into a continuous phase. This phase appears as a top or bottom layer depending upon the relative density of the two layers.

If, prior to the initiation of coacervation, a water-immiscible material, such as an oil, is dispersed as minute droplets in an aqueous solution or sol of an encapsulating colloidal material, and then, a simple electrolyte, such as sodium sulfate, or another, oppositely charged colloidal species is added to induce coacervation, the encapsulating colloidal material forms around each oil droplet, thus investing each of said droplets in a liquid coating of the coacervated colloid. The liquid coatings which surround the oil droplets must thereafter be hardened to produce solid-walled microcapsules.

One of the primary disadvantages of the coacervation encapsulation techniques is the fact that critical control over the concentrations of the colloidal material and the coacervation initiator must be maintained. That is, coacervation will occur only within a limited range of pH, colloid concentration and/or electrolyte concentration. For example, in simple coacervation, if a deficiency of the electrolyte is added, two-phase formation will not occur whereas, if an excess is added, the colloid will precipitate as a lumpy mass. With complex coacervation systems using a colloid having an iso-electric point, pH is especially important since the pH must be adjusted and maintained at a point where both colloids have opposite charges. In addition, when a gelable colloid, such as gelatin, is used as the encapsulating material, coacervation must take place at a temperature above the gel point of the colloid.

Another disadvantage in the prior art microcapsules, especially those comprising hydrophilic colloids as the encapsulating material, is the fact that such capsules are sensitive to conditions of high relative humidity and temperature. In many cases, this may be desirable, such as in utilities where delayed release of the nucleus material is sought. However, in the art of pressure-responsive, transfer-copy systems, such action would result in a degradation of the capsule walls and a subsequent premature release of the marking fluid.

One common disadvantage experienced with microcapsules containing colorless, leuco dye intermediates and produced according to the prior art methods, is the tendency of the dye intermediates to degrade or decompose on prolonged exposure to heat and light. In encapsulated form, these dye intermediates also show an inability to remain in colorless form for extended period of time, especially after they have been coated onto a paper or like web. This inability is considered to be due to atmospheric contamination of the capsule contents by virtue of micropores in the capsule walls.

It is, therefore, the object of this invention to provide a process for the microencapsulation of oils which is devoid of the coacervation phenomenon and all of the disadvantages inherent therewith.

It is another object of this invention to provide oil-containing microcapsules comprising walls of at least one hydrophobic thermoplastic resin.

It is yet another object of this invention to provide a pressure-sensitive and responsive transfer sheet record material comprising a coating of microcapsules applied to one side of a web material, said microcapsules containing a colorless, leuco dye intermediate dispersed or dissolved in an oil and said microcapsules having superior properties in retaining the dye intermediate in colorless form.

These and other objects and features of this invention will become apparent from the following description of the invention and the accompanying drawings.

The aspects of this invention which are capable of illustration are shown in the accompanying drawings wherein:

FIGS. 1 and 2 are flow diagrams which outline the steps of alternative encapsulation processes of this invention.

Figure 1:
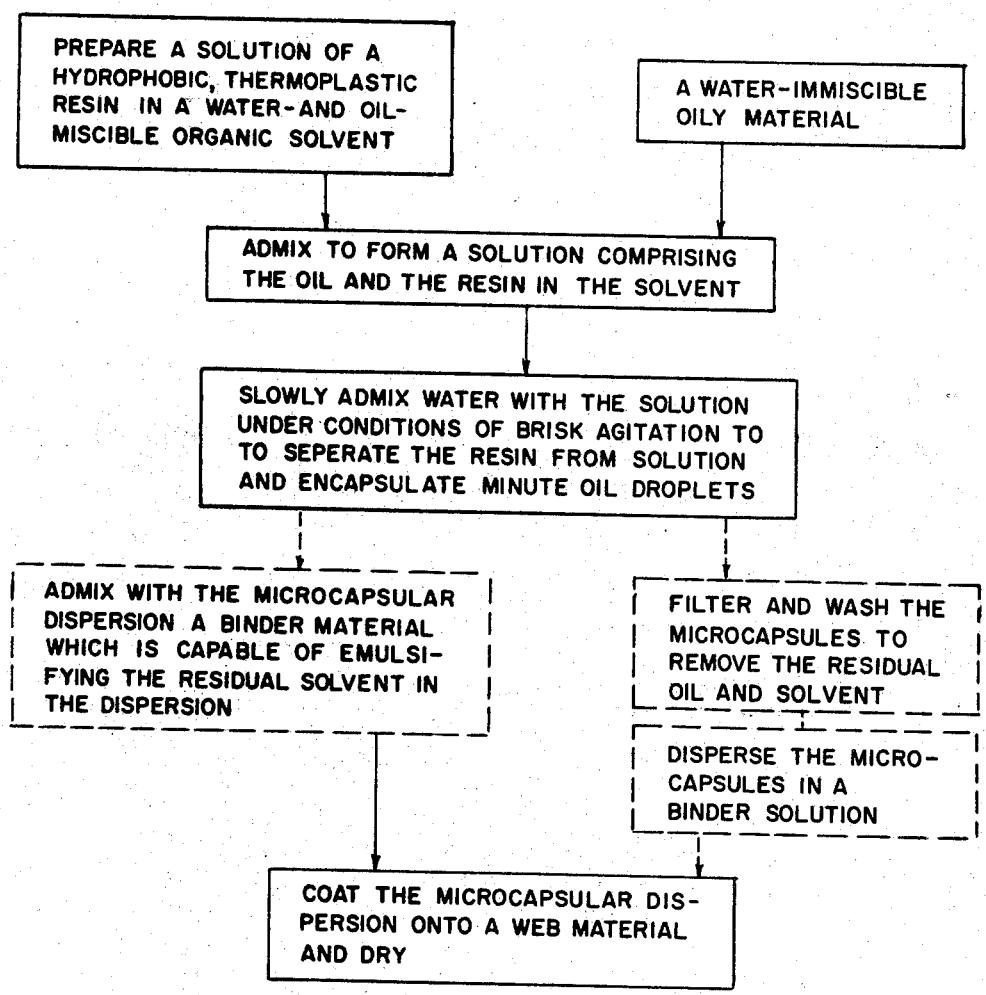

According to the present invention, a process is provided for the formation of microcapsules comprising walls of a hydrophobic, thermoplastic resin and containing minute droplets of an oil. The process may be described briefly as a simple admixing of at least three ingredients. These ingredients are:

(A) a water-immiscible oily material selected from the group consisting of liquid and low melting oils, fats and waxes;
(B) at least one solution comprising a hydrophobic, thermoplastic resin as the solute and a water- and oil-miscible organic liquid as the solvent, said thermoplastic resin being capable of being separated from solution upon dilution with water; and
(C) an aqueous medium in a quantity sufficient to cause the separation of at least one of said thermoplastic resins from solution.

The sequence of admixing these ingredients must be such that encapsulation of the oil droplets by dilution and ultimate separation with the aqueous medium of at least one of the resin solutions occurs as the final operation of the process. In addition, dilution must proceed slowly under conditions of brisk agitation. Thus, dilution can be performed by the addition of the aqueous medium to the oil-resin solution admixture or by the addition of the oil-resin solution admixture to the aqueous medium. In several embodiments of this invention, microcapsules are provided which contain a dispersion comprising one or more oil-containing microcapsules. Thus, once the oily material is encapsulated with the thermoplastic resin, a second dilution operation may be effected by simply adding another resin solution to the aqueous dispersion of the first-formed microcapsules. Consequently, microcapsules containing microcapsules are produced. This second dilution must also proceed slowly under conditions of brisk agitation.

By "water immiscible oily materials" is meant lipophilic materials which are preferrably liquid, such as oils, which will not mix with water and which are inert with regard to the components of the particular system. Low melting fats and waxes may also be used in this invention. However, oils are the preferred nucleus materials since they do not require temperature maintenance. In certain embodiments of this invention, the vapor pressure and viscosity of the oily material are to be considered. For example, in the art of making a transfer sheet record material, a low viscosity-low vapor pressure oil is preferred. The viscosity of the oily medium is a determining factor in the speed with which the markings can be transferred to the copy sheet since low viscosity oils will transfer more quickly than oils of higher viscosity. The vapor pressure should be sufficiently low to avoid substantial losses of the oil through evaporation during the encapsulation operation. A compromise should, therefore, be made in selecting an oil of medium viscosity which will have a reasonable rate of transfer onto the copy sheet and of reasonably low volatility.

In general, the lipophilic nucleus materials can be natural or synthetic oils, fats and waxes or any combination thereof which will meet the requirements of the use for which the microcapsules are intended. Among the materials which can be used are: natural oils, such as cottonseed oil, soybean oil, petroleum lubricating oils, fish liver oils, drying oils and essential oils; synthetic oils, such as methyl salicylate and halogenated biphenyls; low melting fats, such as lard; and liquid or low melting waxes, such as sperm oil and lanolin (wool wax).

Within the scope of the present invention, the herein-disclosed processes may be used to encapsulate an oil alone, or alternatively, the oil may serve merely as a vehicle for carrying another active ingredient or material. In this latter utility, the active material may be dissolved, dispersed or suspended in the oily material. The processes of this invention can, therefore, be used to encapsulate medicines, poisons, foods, cosmetics, adhesives or any other material which finds utility in microcapsular form.

In the preferred utility of this invention, viz., transfer sheet record material, these processes may be used to encapsulate an oily printing ink, such as may be used in smudge-proof typewriter ribbons or carbon papers. In such a use, it has been found expedient to encapsulate a colorless, water-insoluble leuco dye intermediate dissolved in the oil, thus avoiding the necessity of removing the residual colored matter from the external surfaces of the capsules prior to coating as is required in the encapsulation of printing inks. Colorless leuco dye intermediates are wholly conventional in such utilities and are well known in the art. Exemplary of the colorless dye intermediates which have been contemplated for use in this invention are leuco dyes, such as, crystal violet lactone and derivatives of bis(p-dialkylaminoaryl) methane such as disclosed in U.S. Patent Nos. 2,981,733 and 2,981,738. These dye intermediates are colorless in an alkaline medium and react to form a visible color in an acidic medium. Thus, when a capsule containing such a compound is ruptured and the compound is discharged onto an adsorbant, acidic electron-acceptor material, such as a paper web coated with an organic or an inorganic acid material, a visible color appears on the adsorbant material at the point of contact.

Inhibitors may optionally be dispersed in the oily material along with the dye intermediates. Such materials are helpful in preventing the light and heat degradation of the intermediates during the encapsulation procedure, especially when elevated temperatures are required, such as when a fat is encapsulated. Inhibitors are also considered to aid in the stabilization of the colored marking on the copy sheet against the effects of the atmosphere. A small amount (generally about 1 to 10% by weight of the dye) of an inhibitor, such as N-phenyl 2-naphthylamine, has been used in the practice of this invention.

The leuco dye intermediates which are mentioned above are, in general, oil soluble. Oils which are inert with respect to the dye and in which the dye has appreciable solubility, e.g. above 0.5 gram of dye per 100 grams of oil, are preferable. In the majority of the experiments of this invention, cottonseed and soybean oils were used.

The thermoplastic resins which function as the encapsulating materials in the present invention must be of a hydrophobic nature. In other words, they should not be capable of dissolving readily in water. While it is true that all resins exhibit some, even though very small hydrophilic properties, those resins acceptable for use in this invention must for the most part be hydrophobic, that is, more lipophilic than hydrophilic.

In general, the thermoplastic resins are to be linear, macromolecular polymers, copolymers, block polymers, and the like. The preferred resins are those containing no ionizable groups since the extent to which a resin ionizes has an ultimate effect on the resin's hydrophilic-hydrophobic properties. Resins such as polyvinyl chloride and polystyrene are non-ionizable and are, therefore, preferred for use in this invention. However, other resins which can be used are polyvinyl acetate, vinyl chloride-vinylidene chloride copolymers, cellulose acetate and ethyl cellulose. Novolak resins which are linear, thermoplastic condensation products of phenol and formaldehyde, are also capable of being used in the present invention as the thermoplastic resin. The novolaks are permanently fusible and soluble as long as their molecular structure is linear.

The selection of solvents to be used in the practice of this invention will depend on the specific encapsulating thermoplastic resin and the oil employed. Thus, it must be a solvent for both the oil and the resin and also be miscible with water. If the solvent is not miscible with the oil, the resin may be dissolved preferentially by the oil. The solvent must be miscible with water in order for the resin to be separated from solution when the oil-resin mixture is admixed with water.

In general, the solvents which are preferable are organic and of low polarity. Tetrahydrofuran has been used successfully with all of the resins heretofore mentioned and is, therefore, the preferred solvent in the practice of this invention. Examples of other solvents which are operable are dioxane, cyclohexanone, methyl tetrahydrofuran, methyl isobutyl ketone and acetone.

A small amount of stabilizer may be incorporated with the solution of the thermoplastic resin to increase the resins stability towards heat, light and atmospheric oxygen. Examples of stabilizers which may be used include dibasic lead phosphite, dibasic lead stearate, tribasic lead sulfate monohydrate, dibutyltin maleate and others well known to the art. The use of such stabilizers is wholly conventional.

In certain embodiments of this invention, the aqueous medium which effects the dilution of the resin solution may comprise an aqueous colloidal solution of an amphiphilic emulsifying agent. However, the aqueous medium need not contain an amphiphilic emulsifying agent in order to effect encapsulation of the oil when the resin solution is admixed therewith. Whether or not an amphiphilic emulsifying agent is contained in the aqueous medium, the thermoplastic resin is caused to be separated or precipitated from solution as minute particles, each of which invests an oil droplet within an essentially impermeable resinous wall. Essentially all of the oily material is contained within the resin particles.

When water, which does not contain the emulsifier, is used for the dilution operation, the microcapsules which are produced appear as microscopic particles which settle to the bottom of the mixing vessel. The supernatant liquid comprises the residual organic solvent dissolved in water. Preferably, the microcapsules are filtered from the aqueous medium and washed. This operation rids the microcapsules of any residual solvent which may stain the web material to be coated. Alternatively, however, the residual solvent in the supernatant liquid may be emulsified with the addition of an amphiphilic emulsifying agent to thereby prevent such staining. Thus, by including the emulsifying agent in the dilution operation, a more efficient process results. Exemplary of the amphiphilic emulsifying agents which can be used in the instant invention are: naturally-occurring, lyophilic colloids including gums, proteins and polysaccharides, such as, gum arabic, gum tragacanth, agar, gelatin and starch; and synthetic materials such as, methyl cellulose, polyvinyl pyrrolidone, and copolymers of methyl vinyl ether and maleic anhydride. Materials such as these also aid in securing the microcapsules to the web material.

Certain of the emulsifying agents of the type described above give an acidic solution when dissolved in water. When such materials are used to dilute an admixture comprising the resin solution and an oil containing a leuco dye intermediate, a color will naturally be produced since these dye intermediates react in an acid medium. To prevent this, a basic species or buffer may be incorporated in the water of dilution in order to maintain the pH of the system well above seven. Even without such an emulsifier, it is preferable to add this basic species to the system to prevent an undesired or premature reaction of the dye intermediate by virtue of adsorbed carbon dioxide from the atmosphere. In general, from 0.05 to 0.1 gram-equivalent of the material such as sodium carbonate will suffice for such purposes. Such a material in the prescribed amounts does not interfere with the color reaction of the dye intermediates once they have been transferred to a copy sheet containing an electron-acceptor adsorbent material.

The present invention requires that the dilution of the thermoplastic resin solution takes place as the final operation of the process, which dilution takes place slowly and under conditions of brisk agitation. Brisk agitation is required in order to obtain very small oil droplets during the dilution operation, and, ultimately, very small capsules. Thus, microcapsules having diameters ranging from about 1 to several hundred microns can be produced according to the practices of this invention. Agitation may be achieved by means of a high speed mixer or impeller, by ultrasonic waves or by other conventional means. Brisk agitation need be maintained only in the zone of admixing and not throughout the entire volume of the liquid to which the other liquid is being added.

It has been found that the slower the speed of admixing, the more impermeable the capsule walls will be to both internal and external leakage. Slow admixture may be achieved by any of the conventional means, such as by spraying in the form of a fine mist or by dripping.

When an aqueous colloidal solution of an amphiphilic emulsifying agent is used for the dilution operation, the oil-containing microcapsules which are produced remain evenly dispersed in the viscous aqueous medium. This microcapsular dispersion may be coated directly onto a web material, or, alternatively, a second resin solution may be admixed with the dispersion. Admixture of the second resin solution with the dispersion must also be preformed slowly and accompanied by brisk agitation. By virtue of the water already in the dispersion, the second resin solution is effectively diluted. This second dilution operation causes a separation or precipitation of the resin and the simultaneous encapsulation of the previously formed, oil-containing microcapsules. Essentially all of the previously formed microcapsules are contained within the walls of the second resin. The thermoplastic resins which may be used in this second dilution operation are the same as those previously described.

FIGS. 1 and 2 of the attached drawings illustrate two processes for the microencapsulation of oils. In the process of FIG. 1, a solution of a hydrophobic, thermoplastic resin in a water- and oil-miscible organic solvent is prepared and admixed with a water-immiscible oily material. The admixture defines a solution of the resin and the oil dissolved in the solvent. Slowly and under conditions of brisk agitation, water is admixed with the solution. That is, water may be added to the solution or the solution may be added to water. In either case, the thermoplastic resin separates from the solution as minute, solid particles which settle to the bottom of the mixing vessel. Each of the particles contains an oil droplet. Alternatively, the microcapsules may be filtered and washed and then dispersed in a binder solution, or the aqueous medium containing the microcapsules may be admitted with an amphiphilic emulsifying agent which emulsifies the residual solvent in the mixture and acids in binding the microcapsules to the web material.

In the process illustrated in FIG. 2, the solution formed by admixing the oily material and the resin solution is admixed with an aqueous colloidal solution of an amphiphilic emulsifying agent. This admixture proceeds slowly with brisk agitation. The introduction of water into the resin solution causes the precipitation of the resin and the simultaneous encapsulation of the oily material. The resin particles remain evenly dispersed in the aqueous solution of the emulsifier. With continued agitation, a second solution, comprising a thermoplastic resin in a water- and oil-miscible organic solvent, is slowly admixed with the microcapsular dispersion. The water which is already present in the dispersion causes the thermoplastic resin to separate from the second resinous solution thereby encapsulating the first-formed microcapsules along with some of the aqueous dispersion medium. Thereafter, this microcapsular dispersion may be coated onto a web material and dried, or, as an optional step, an additional amount of an emulsifier may be added to the dispersion prior to coating to emulsify the residual solvent from the second resin solution.

The microencapsulated oils of this invention are intended to be used in the manufacture of transfer sheet record material. More specifically, capsules containing a leuco dye intermediate in the oil are to be coated onto one side of a web material and dried. The coating operation is performed by conventional means, such as by use of an air knife. The capsule coatings are dried at temperatures ranging from about 40 to 75° C. At these temperatures, no appreciable degradation of the capsules, and in particular, the leuco dye intermediate, takes place.

The web material commonly used in transfer sheet record material is paper and is, therefore, preferable in the practice of this invention. However, the microcapsules produced by the herein disclosed processes are also capable of being coated onto other materials such as plastic and fabric or textile webs. When using a web material having a high degree of porosity, it is advisable to pre-coat the web with a material which will reduce seepage of the microcapsular coating through the web. Impregnating the web material with polyvinyl alcohol or a butadiene-styrene latex is the conventional practice for producing an essentially impervious substrate.

Figure 3:
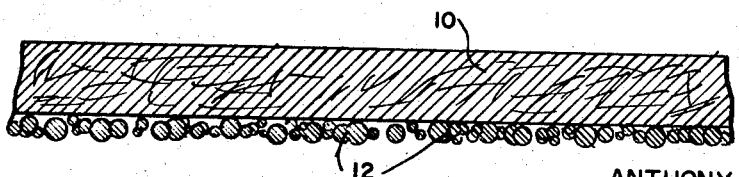
FIG. 3 is a cross-sectional view on an enlarged scale of a portion of a transfer sheet embodying the present invention.

FIG. 3 represents a cross-sectional view of a portion of a transfer sheet record material produced according to the practices of the present invention wherein a paper web material 10 contains a substantially uniform coating of microcapsules 12, each of which invests an oil which contains a colorless leuco dye intermediate. The binding agent used to secure the microcapsular coating to the paper web is not shown.

Transfer sheet made according to the various embodiments of this invention have a pleasant appearance and are almost completely smudge-proof when brought into face-to-face contact with a copy sheet containing a coating of an adsorbent electron-acceptor material. In addition, they show a marked improvement over the transfer sheets presently available in commerce. It has been found that by encapsulating microcapsules which contain the leuco dye intermediate dissolved in the oil and which microcapsules are dispersed in an aqueous medium comprising an amphiphilic emulsifying agent, the heat and light stability of the dye intermediate is greatly enhanced. Furthermore, there is less chance of a premature color reaction of the dye intermediate. For example, exposure of the coated papers to direct sunlight for five hours, to a temperature of 85° C. for 20 hours, and to a temperature of 70° C. for 18 hours in a 90% relative humidity environment does not alter either the pleasant appearance or the transfer and color-forming properties of the paper.

The following examples illustrate the best modes contemplated for carrying out this invention:

EXAMPLE 1

To 50 milliliters of cottonseed oil containing 3 grams of 1 - [bis(p-dimethylaminophenyl)methyl] - pyrrolidine are added 100 milliliters of tetrahydrofuran containing 10 grams of polyvinyl chloride and 0.5 grams of dibasic lead phosphite. Slowly and with brisk agitation, 70 milliliters of water containing 0.1 gram-equivalent of sodium carbonate are added to the mixture. Finely divided particles of polyvinyl chloride precipitate from the mixture during the water addition, each of which contains an oil droplet with the dye intermediate dissolved therein. Subsequently, 100 milliliters of water containing 20 grams of gelatin and 12 grams of methyl cellulose are mixed with the aqueous medium containing the resin particles. This dispersion is then coated onto a paper web material and dried at about 50 to 60° C.

EXAMPLE 2

The identical operation as described in Example 1 is followed in this example substituting polystyrene for polyvinyl chloride as the encapsulating material. Identical results are obtained.

EXAMPLE 3

A solution is prepared by admixing 50 milliliters of soybean oil containing 3 grams of 1-[bis(p-dimethylaminophenyl)methyl]-benzotriazole and 33 milliliters of tetrahydrofuran containing 3.3 grams of polyvinyl chloride and 0.2 gram of dibasic lead phosphite. This solution is slowly added to a large volume of water (approximately 400 milliliters) under conditions of brisk stirring. During the addition, minute particles of the resin precipitate, simultaneously encapsulating the dye-containing oil. The microcapsules are thereafter separated from the aqueous medium by filtration and washed with a 5% by volume acetone in water solution. The particles are then dispersed in 75 milliliters of water containing 15 grams of methyl cellulose and 15 milliliters of a 5 N sodium carbonate solution. This dispersion is then coated onto paper and dried at about 50 to 60° C.

EXAMPLE 4

The identical operation as described in Example 3 is followed in this example substituting polystyrene for polyvinyl chloride as the encapsulating material. Identical results are obtained.

EXAMPLE 5

A solution is prepared by dissolving 5 grams of ethyl cellulose in 60 milliliters of tetrahydrofuran. This solution is then mixed with 35 milliliters of cottonseed oil containing 2 grams of 1-[bis(p-dimethylaminophenyl)methyl]-pyrrolidine. Slowly and with brisk agitation, 130 milliliters of water are added to the above mixture, which addition results in the encapsulation of the dye-containing oil. On completion of the water addition, 5 grams of methyl cellulose and 10 milliliters of a 5 N sodium carbonate solution are mixed with the aqueous medium containing the microcapsules. This mixture is then coated onto a paper web and dried.

EXAMPLE 6

Ten grams of ethyl cellulose are dissolved in 100 milliliters of tetrahydrofuran. Twenty-five milliliters of cottonseed oil containing 1.5 grams of 1-[bis(p-dimethylaminophenyl)methyl]-pyrrolidine are added to the resin solution. This mixture is slowly added to 400 milliliters of water with vigorous stirring. A fine precipitate is formed which is filtered and washed in a 5% by volume methyl alcohol in water solution. The precipitate is then dispersed in 100 milliliters of water containing 5 grams of methyl cellulose and 0.1 gram-equivalent of sodium carbonate. This dispersion is thereafter coated onto a paper web and dried.

EXAMPLE 7

To 25 milliliters of cottonseed oil containing 1.5 grams of 1 - [bis(p-dimethylaminophenyl)methyl]-benzotriazole are added 40 milliliters of acetone containing 4 grams of cellulose acetate. This mixture is added slowly to 400 milliliters of water with brisk stirring. During the addition, minute particles of cellulose acetate precipitate and simultaneously encapsulate the oil containing the dye intermediate. These particles are then filtered and washed with a 5% by volume methyl alcohol-water solution and dispersed in 150 milliliters of water containing 3 grams of methyl cellulose. The microcapsular dispersion is thereafter coated onto paper and dried.

EXAMPLE 8

Fifty milliliters of cottonseed oil containing 3 grams of 1 - [bis(p-dimethylaminophenyl)methyl]-pyrrolidine are admixed with 15 milliliters of tetrahydrofuran containing 6 grams of polyvinyl chloride and 0.25 gram of dibasic lead phosphite. This mixture is added slowly to 120 milliliters of water containing 20 grams of gelatin and 0.1 gram-equivalent of sodium carbonate. The addition proceeds with vigorous stirring of the aqueous medium and results in the precipitation of the resin from solution and the simultaneous encapsulation of the oil droplets containing the dye intermediate. The precipitated resin particles are evenly dispersed in an aqueous medium containing gelatin and tetrahydrofuran. To this dispersion, a solution comprising 2 grams of polyvinyl chloride dissolved in 15 milliliters of tetrahydrofuran is added slowly with continued stirring. By virtue of the water present in the dispersion, polyvinyl chloride precipitates from the newly added solution and encapsulates the dispersed microcapsules. Some of the dispersion medium is also encapsulated by the second precipitation of polyvinyl chloride. Twelve grams of methyl cellulose are then added to the dispersion and the resulting mixture coated and dried on a paper web.

EXAMPLE 9

The identical operation as described in Example 8 is followed in this example substituting polystyrene for polyvinyl chloride in both of the resinous solutions. Identical results are obtained.

Although the invention has been described in considerable detail with particular reference to certain preferred embodiments thereof, variations and modifications can be effected within the spirit and scope of the invention as described hereinbefore, and as defined in the appended claims.

I claim:
1. A process for the formation of microcapsules in the absence of coacervation, the capsule walls of which comprise an essentially impermeable, hydrophobic, thermoplastic resin, said microcapules containing minute droplets of a water-immiscible oily material, said process comprising admixing:
   (A) a water-immiscible oily material selected from the group consisting of liquid and low melting oils, fats and waxes;
   (B) at least one solution comprising a hydrophobic, thermoplastic resin as the solute and a water- and oil-miscible organic liquid as the solvent, said thermoplastic resin being capable of being separated in solid particle form from solution upon dilution with water; and
   (C) an aqueous medium in a quantity sufficient to cause the separation of at least one of said thermoplastic resins from solution,
the sequence of said admixing being such that at least one of said thermoplastic resins in the admixture separates from solution in solid particle form about a nucleus of said oily material upon dilution with said aqueous medium as the final operation of said process, which dilution takes place slowly and under conditions of brisk agitation.

2. A process as defined in claim 1 wherein said aqueous medium is added to an admixture comprising a water-immiscible oily material and at least one solution comprising a hydrophobic, thermoplastic resin as the solute and a water- and oil-miscible organic liquid as the solvent.

3. A process as defined in claim 1 wherein an admixture comprising a water-immiscible oily material and at least one solution comprising a hydrophobic, thermoplastic resin as the solute and a water- and oil-miscible organic liquid as the solvent is added to said aqueous medium.

4. A process as defined in claim 1 wherein said aqueous medium consists essentially of water.

5. A process as defined in claim 1 wherein said oily material contains therein a colorless dye intermediate.

6. Pressure-rupturable microcapsules made according to the process of claim 1.

7. Pressure-rupturable microcapsules made according to the process of claim 5.

8. A pressure-sensitive transfer sheet record material for use in a transfer-copy system having on one side thereof a coating of microcapsules as defined by claim 7.

9. A process as defined in claim 1 wherein said dilution is followed by the addition of at least one solution comprising a hydrophobic, thermoplastic resin as the solute and a water- and oil-miscible organic liquid as the solvent, said thermoplastic resin being capable of being separated from solution upon dilution with the water in said admixture, whereby said thermoplastic resin separates from solution and encapsulates the previously formed microcapsules.

10. A process as defined in claim 9 wherein said oily material contains therein a colorless dye intermediate.

11. Pressure-rupturable microcapsules made according to the process of claim 9.

12. Pressure-rupturable microcapsules made according to the process of claim 10.

13. A pressure-sensitive transfer sheet record material for use in a transfer-copy system having on one side thereof a coating of microcapsules as defined by claim 12.

14. A process as defined in claim 1 wherein said hydrophobic, thermoplastic resin is polystyrene.

References Cited
UNITED STATES PATENTS

| | | | |
|---|---|---|---|
| 3,016,308 | 1/1962 | Macaulay | 252—316 X |
| 3,043,782 | 7/1962 | Jensen | 252—316 |
| 3,265,629 | 8/1966 | Jensen | 252—316 |

RICHARD D. LOVERING, *Primary Examiner.*

U.S. Cl. X.R.

71—64; 99—166; 117—36.2, 100; 424—17, 19